United States Patent [19]

Loeffler

[11] 4,224,756
[45] Sep. 30, 1980

[54] ANIMAL TRAP

[75] Inventor: Herbert H. Loeffler, Arlington, Mass.

[73] Assignee: Woodstream Corporation, Lititz, Pa.

[21] Appl. No.: 5,034

[22] Filed: Jan. 19, 1979

[51] Int. Cl.³ ............................................ A01M 23/26
[52] U.S. Cl. ....................................................... 43/90
[58] Field of Search ......................... 43/88, 90, 92, 91

[56] References Cited

U.S. PATENT DOCUMENTS

| 2,564,811 | 8/1951 | Mau | 43/90 |
| 2,701,428 | 2/1955 | Mau | 43/90 |
| 2,947,107 | 8/1960 | Lehn | 43/92 |

*Primary Examiner*—Harold D. Whitehead
*Attorney, Agent, or Firm*—Holman & Stern

[57] ABSTRACT

An animal trap, of the rotating frame type, having an improved frame construction is disclosed. The trap of the present invention is constructed so that adjacent connecting end portions are substantially parallel when in the closed position, and with the connecting end portions, when in an upright position, being located at an angle relative to the vertical of from about 5 to about 10 degrees. Such a construction results in increased force during closure of the trap, thus providing a trap which is more humane.

5 Claims, 8 Drawing Figures

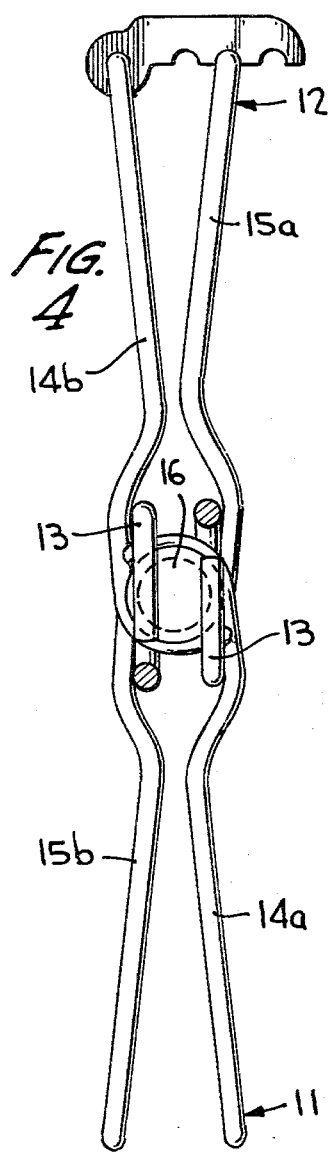
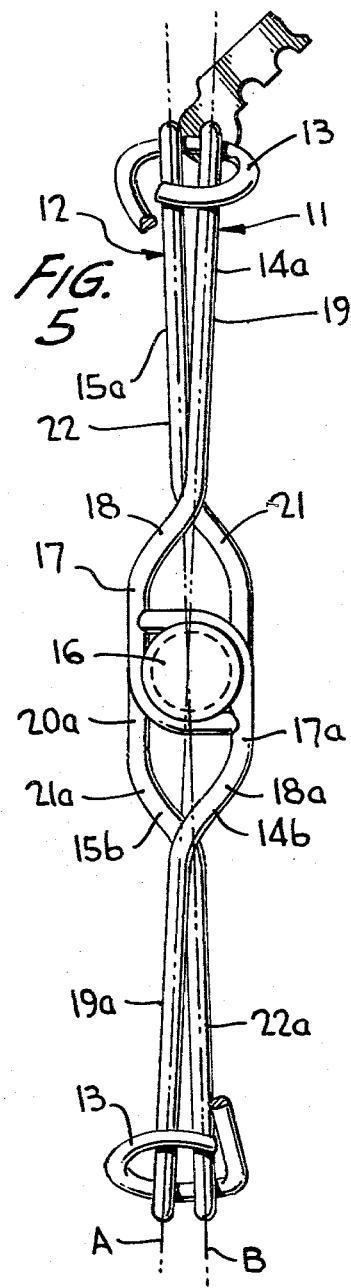
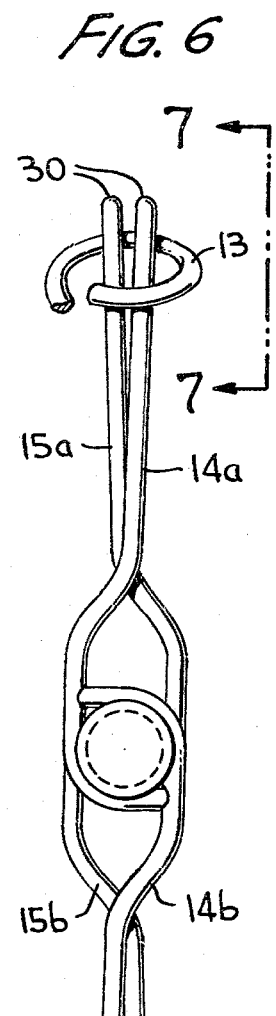
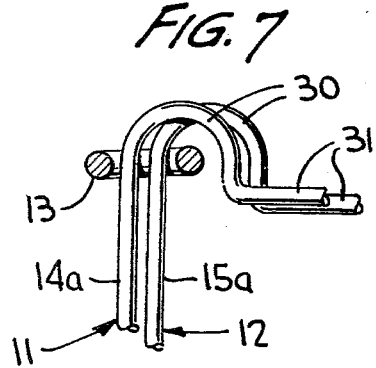

ANIMAL TRAP

BACKGROUND AND SUMMARY OF THE INVENTION

The present invention relates to a rotating frame animal trap. More particularly, the present invention relates to improvements in the frame design of the rotating frame type of trap. By a rotating frame animal trap is meant a trap which comprises a pair of similar frames pivotally connected at adjacent ends for relative rotation on a common axis so as to form by their sides two pairs of co-acting jaws.

One drawback in the use of such traps arises from the fact that the clamping force of the trap increases as the trap closes, and reaches a maximum as the actuator rings reach the ends of their runs and bear against the extremities of adjacent ends of the trap frames. Thus, when large or bulky-bodied animals are caught in the trap, their body size may prevent the jaws of the trap from closing enough so that the actuator arms can expand sufficiently about these adjacent ends and thus develop enough leverage and clamping force to quickly kill the animal. It can therefore be seen that the humane efficiency of the trap, i.e., the ability of the trap to kill any desired animal passing through it, large or small, so that the animal, when caught by the trap, will be killed as quickly as possible, is adversely affected insofar as bulky animals are concerned. Previous solutions to this problem are described, for example, in U.S. Pat. Nos. 3,760,531 and 3,971,155.

By the present invention, there is provided an improved rotating frame animal trap, having features which provide for increasing the force of the jaws so as to kill the trapped animal as quickly as possible, thus providing a trap which is more humane. It should be pointed out that the trap of the present invention is not more effective for large bulky animals, if they fall outside the range of high forces, but it is more effective for animals whose neck is within the range of high forces. The trapper determines the type of target animal by means of trap placement, and selects a trap of appropriate size.

The animal trap of the present invention includes, as general features, two similar frames each formed of round wire stock and having opposite side portions serving as jaws and connecting end portions. The frames are pivotally connected through adjacent end portions for relative rotation between set and closed positions about a common axis. Trigger means is provided for releasably maintaining the trap in a set position. An actuator is provided for rapidly and forcefully effecting such rotation upon release of the trigger. The actuator includes two arms which are spring biased at one end so that the other ends, if unobstructed, would move to a distance substantially greater than the width of the frame ends. Each arm of the actuator terminates in a ring respectively adapted to encircle adjacent ends of the frames on opposite sides of the axis.

The improvement of the present invention resides in constructing the trap frame members in a manner that results in connecting end portions thereof being parallel or nearly parallel to each other when in the closed position, and with the connecting end portions, when in an upright position, being located at an angle relative to the vertical of from about 5 to about 10 degrees. It has been found that the more clearly parallel the adjacent connecting end portions of the jaws are, and hence the smaller the angle between said connecting end portions and the vertical, the greater will be for force achieved by the jaws of the trap during closure.

BRIEF DESCRIPTION OF THE DRAWINGS

The advantages and features of the animal trap of the present invention will be more fully understood from the following description of the preferred embodiments, taken in conjunction with the accompanying drawings, wherein:

FIG. 4 is a side elevational view of the trap of the present invention, showing the trap in the open or set position, FIG. 5 is a side elevational view similar to FIG. 4, but with the trap in the closed position;

FIG. 6 is a side elevational view of a second embodiment of the present invention;

FIG. 7, is a sectional view of a portion of the embodiment of FIG. 6, taken along line 7—7 of FIG. 6.

DESCRIPTION OF THE PREFERRED EMBODIMENTS

Figure 2:
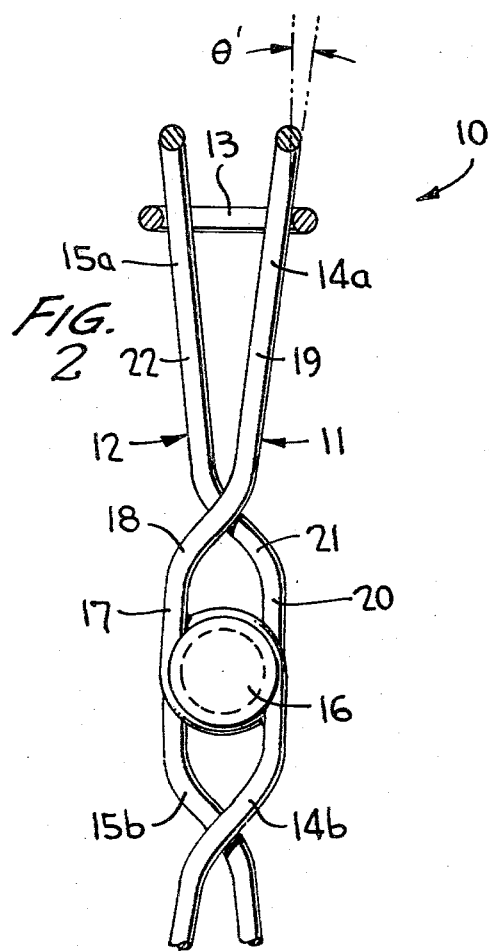
FIG. 2 is a side elevationtional view of a portion of the trap of the present invention, showing the jaws in a partially closed position.

In the illustrated embodiment of the present invention as shown in FIGS. 2, 4 and 5, there is provided a trap 10 having a pair of jaw frames 11 and 12 connected by a pivot 16, with FIG. 2 showing the jaws 11, 12 just prior to their reaching the closed position. The trap 10 may, for example, be of the general type described in U.S. Pat. No. 2,947,107 or U.S. Pat. No. 3,010,245, both of which are incorporated herein by reference. In FIG. 2, ring 13 of the actuator (not shown) is located in an upper position, as it moves to close the jaws 11, 12. Jaw frame 11 includes an end made up of end portions 14a and 14b while jaw frame 12 includes an end made up of end portions 15a and 15b.

The actuator ring 13 encircles the jaw end portions 14a, 15a of the trap 10 and is positioned adjacent the pivot 16 when the trap 10 is in the set or open position, as shown in FIG. 4. Upon release of the trap 10, the actuator ring 13 rapidly moves upwardly along the end portions 14a, 15a under the action of the spring tension of the actuator, as shown in FIG. 2, finally reaching the position shown in FIG. 5 wherein the jaws 11, 12 are closed. A similar actuator ring 13 operates in conjunction with end portions 14b, 15b.

In order that the actuator ring 13 can move sufficiently rapidly along end portions 14a, 15a, thus developing enough leverage and clamping force to quickly kill the animal, it is a main feature of the present invention that the end portions, 14a, 15a are as nearly parallel as possible when in the closed position and that the angle θ' which an individual end portion 14a or 15a makes with the vertical when in an upright position, as shown in FIG. 2, be as small as possible. A similar configuration should be provided for the opposite end portions 14b, 15b. Preferably, the angle $\theta'$ will be from about 5 to about 10 degrees. The angle $\theta'$ is the angle against which the spring of the actuator operates in moving the actuator ring 13 upwardly. The more nearly parallel the jaws 11, 12, and the smaller the angle $\theta'$, the greater will be the force developed by the actuator spring.

Figure 1:
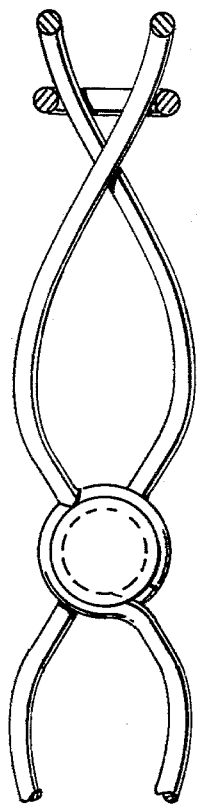
FIG. 1 is a side elevational view of a portion of a conventional trap frame of the prior art, showing the jaws in a partially closed position.
Figure 3:
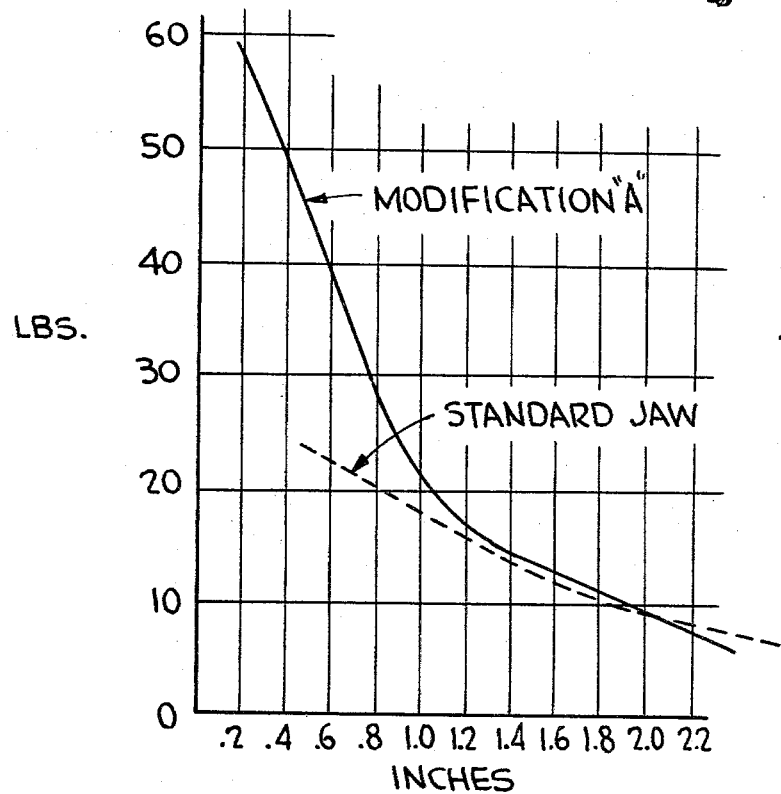
FIG. 3 is a graph showing the force curve during closure of the trap of the present invention which is labeled modification A, relative to a standard jaw trap of the prior art such as that shown in FIG. 1.

The graph in FIG. 3 shows the force curve for the present invention, labeled modification "A", compared to the force curve for a conventional trap such as that shown in FIG. 1. The significant feature shown on the graph is the rapid increase of force at openings of less than 1 inch.

In FIG. 2, the trap 10 of the present invention is shown partially or almost closed and with the end portions 14a, 15a being urged closed by the ring 13. In FIG. 5, the trap 10 is shown as fully closed with the ring 13 at the outermost extremity of the end portions 14a, 15a. It is seen in FIG. 5 that end portion 14a includes a vertical inner arm portion 17 located immediately adjacent the pivot 16. Above the vertical inner arm portion 17, end portion 14a curves inwardly at an angle of approximately 45 degrees to the vertical to form angular intermediate arm portion 18 and then resumes a substantially vertical configuration as an outer arm portion 19 having an angle relative to the vertical of from about 5 to about 10 degrees, as previously discussed. Portions 17 and 18 each comprise approximately one-sixth of the total length of end portion 14a, and portion 19 comprises the remaining approximately two-thirds of end portion 14a. In a similar manner, end portion 15a incudes vertical inner arm portion 20 dajacent the pivot, followed by intermediate arm portion 21 which is curved inwardly at an angle of approximately 45 degrees to the vertical, and vertical outer arm portion 22 having an angle relative to the vertical of from about 5 to about 10 degrees. Also, portions 20 and 21 each comprise approximately one-sixth of the total length of end portion 15a, and portion 22 comprises the remaining approximately two-thirds of end portion 15a. Likewise end portion 14b comprises an inner arm portion 17a, an intermediate arm portion 18a and an outer arm portion 19a and end portion 15b comprises an inner arm portion 20a, an intermediate arm portion 21a and an outer arm portion 22a. Further, the outer arm portions 19, 19a of frame 11 have a common longitudinal axis A which passes through the axis of rotation of the frames and outer arm portions 22, 22a of frame 12 have a common longitudinal axis B which also passes through the common axis of rotation of the frames. The inner arm portions 17, 17a of frame 11 are on opposite sides of axis A and likewise, the inner arm portions 20, 20a of frame 12 are on opposite sides of axis B.

In FIG. 2, there is indicated the angle $\theta'$ representing the angle of the individual end portion 14a or 15a with the vertical. Each of the end portions 14a, 14b, 15a, 15b is constructed so as to form a similar angle $\theta'$ with the vertical when in the closed position. A comparison of FIGS. 1 and 2 shows that the angle $\theta'$ is smaller than the angle $\theta$ for the conventional prior art trap shown in FIG. 1.

By constructing the trap 10 in the above manner, it has been found that the actuator rings 13 are allowed to expand sufficiently rapidly to develop enough leverage and clamping force to quickly kill the animal, thus resulting in a highly humane and efficient trap.

In FIGS. 6 and 7 there is shown an embodiment in which a semicircular loop 30 is provided at each of the extreme or upper ends of end portions 14a, 15a. Such loops 30 are formed in conjunction with side portions 31 of the jaws 11, 12. Similar loops 30 are provided at the extreme ends of end portions 14b, 15b. The purpose of the loops 30 is to hold the respective ring 13 of the actuator spring. Thus these loops 30 should describe a complete half circle, as shown in FIG. 7.

Figure 8:
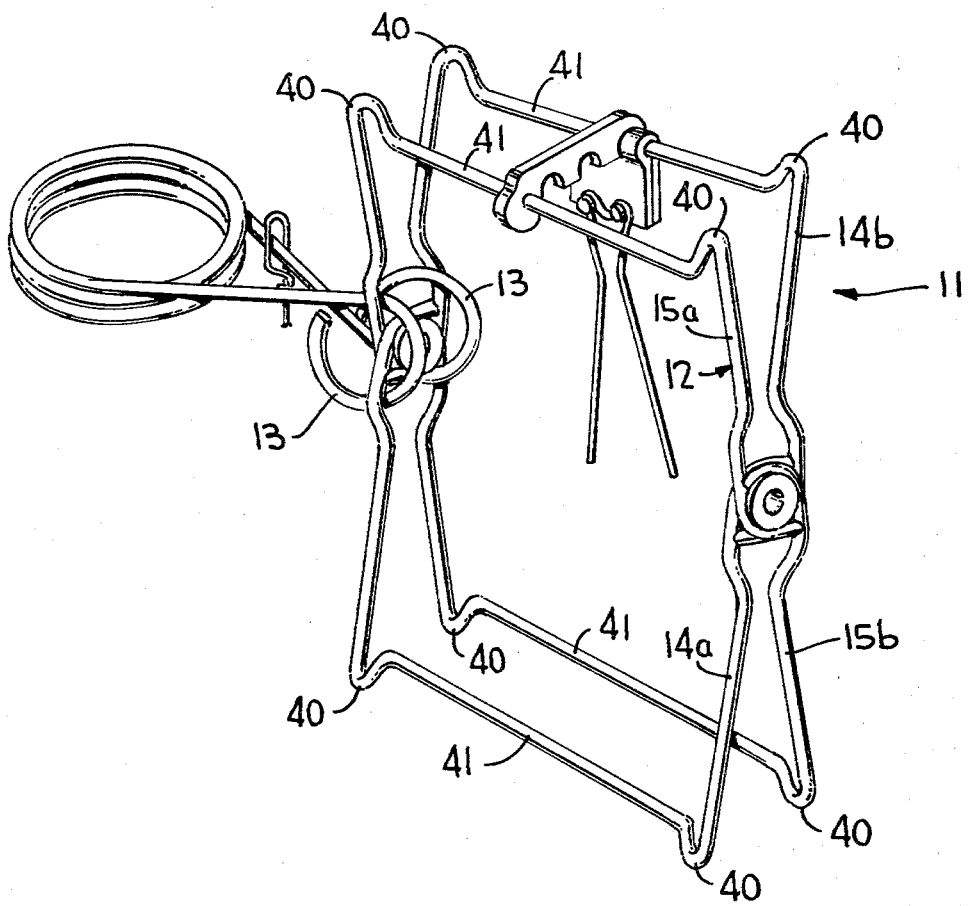
FIG. 8 is a perspective view of a third embodiment of the present invention.

In FIG. 8 there is shown an embodiment having a so-called "bent jaw" configuration. In this embodiment, the extreme ends 40 of the connecting end portions 14a and 14b, 15a and 15b are so shaped, as the ends 40 progress radially outwardly from the axis of rotation of the jaw frames 11, 12 that each end 40 extends to a point out of the common plane of the jaw side portions 41 on the side of the respective frame 11 or 12 remote from the other frame when viewed with the trap in the closed position, and then each end 40 returns to said plane wherein it connects with one end of a side portion 41. The point may be located at a distance from the axis of rotation about the same as or greater than the distance of said side portion 41 from the axis. Where the point is located at a greater distance from the axis of rotation than is the side portion 41 in question, then it is more difficult for the actuator ring 13 to slide over the corresponding corners of the frames 11, 12 of the trap 10 onto the side portions 41 of the jaws thereof. This bent jaw configuration is described in U.S. Patent Application Ser. No. 501,755 filed Aug. 21, 1974, U.S. Pat. No. 4,117,623, granted Oct. 3, 1978, which is commonly assigned, said application being incorporated herein by reference.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

The embodiments of the invention in which an exclusive property or privilege is claimed are defined as follows:

1. In an animal trap having two similar frames each having opposite side portions serving as jaws and connecting ends, said frames being pivotally connected through adjacent ends for relative rotation between set and closed positions about a common axis of rotation, trigger means for releasably maintaining the trap in a set position and an actuator, capable of rapidly and forcefully effecting such rotation upon release of the trigger means, said actuator having two arms spring biased at one end so that the other ends if unobstructed would move to a distance substantially greater than the width of said frame ends, each arm terminating in a ring respectively adapted to encircle adjacent ends of the frames on opposite sides of said axis, the improvement wherein each end of each frame comprises:

a pair of outer arm portions connected to opposite jaws of the frame respectively, said outer arm portions having a common longitudinal axis which passes through said common axis of rotation of the frames;

a pair of inner arm portions on opposite sides of said common longitudinal axis respectively; and a pair of intermediate arm portions connecting the respective outer arm portions with the respective inner arm portions.

2. The animal trap of claim 1, wherein each of said intermediate arm portions is curved inwardly at an angle of approximately 45 degrees to said common longitudinal axis.

3. The animal trap of claim 1, wherein said inner arm portions and said intermediate arm portions comprise approximately one-sixth of the total length of said end portion and said outer arm portions comprise the remaining approximately two-thirds of said end p portion.

4. The animal trap of claim 1, wherein the extreme end of each of said outer arm portions is formed as a semicircular loop in conjunction with the adjacent side portion of each jaw.

5. The animal trap of claim 1, wherein said side portions of each frame lie in a common plane and each outer arm portion is so shaped, as it progresses radially outwardly from said common axis of rotation, that it extends to a point out of the common plane of said side portions on the side thereof remote from the other frame when viewed with the trap in closed position, and then returns to said plane wherein it connects with a side portion.

* * * * *